US008647108B2

(12) United States Patent
Mironov (10) Patent No.: US 8,647,108 B2
(45) Date of Patent: *Feb. 11, 2014

(54) ADJUSTABLE ALIGNING DEVICE FOR LARGE COMPOSITE MOULDS

(75) Inventor: Gabriel Mironov, Montreal (CA)

(73) Assignee: Suzhou Red Maple Wind Blade Mould Co., Ltd., Jiangsu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/255,966

(22) PCT Filed: Mar. 12, 2010

(86) PCT No.: PCT/IB2010/051077
§ 371 (c)(1),
(2), (4) Date: Jan. 3, 2012

(87) PCT Pub. No.: WO2010/103492
PCT Pub. Date: Sep. 16, 2010

(65) Prior Publication Data
US 2012/0093955 A1 Apr. 19, 2012

(30) Foreign Application Priority Data
Mar. 13, 2009 (CN) ...................... 2009 2 0006582 U (51) Int. Cl.
*B29C 33/20* (2006.01)
(52) U.S. Cl.
USPC ...................................... 425/451.9; 425/595
(58) Field of Classification Search
USPC .................. 425/408, 412, 450.1, 451.9, 595; 264/334
See application file for complete search history.

(56) References Cited

U.S. PATENT DOCUMENTS

| 3,720,491 | A | * | 3/1973 | Dedek | 425/78 |
| 3,986,805 | A | * | 10/1976 | Haines | 425/590 |
| 4,003,283 | A | | 1/1977 | Janiszewski | |
| 4,315,727 | A | * | 2/1982 | Black | 425/563 |
| 4,403,810 | A | * | 9/1983 | Bieneck | 425/589 |
| 4,537,570 | A | * | 8/1985 | Black et al. | 425/450.1 |
| 5,056,999 | A | * | 10/1991 | Lewis et al. | 425/150 |
| 5,494,435 | A | * | 2/1996 | Vandenberg | 425/589 |

(Continued)

FOREIGN PATENT DOCUMENTS

| CN | 1678441 A | 10/2005 |
| CN | 201357535 Y | 12/2009 |

(Continued)

OTHER PUBLICATIONS

Apr. 26, 2011 Final Office Action in corresponding Japanese Application No. 2007-290124.

(Continued)

*Primary Examiner* — Dimple Bodawala
(74) *Attorney, Agent, or Firm* — Novak Druce Connolly Bove + Quigg LLP (57) ABSTRACT

An adjustable aligning device (300) for large composite molds comprising a first half part and a second half part includes a first member (1) and a second member (2) which are coupled to the first half part and the second half part of the molds respectively. The first member (1) and the second member (2) have mating portions and are capable of moving relative to each other. The adjustable aligning device (300) allows the fine calibration of overbite of the mold, and can reduce the time and skill needed for aligning the molds.

5 Claims, 7 Drawing Sheets

(56) References Cited

U.S. PATENT DOCUMENTS

| | | | | |
|---|---|---|---|---|
| 6,129,009 | A * | 10/2000 | Haas et al. | 99/353 |
| 6,514,452 | B1 * | 2/2003 | Maier | 264/542 |
| 6,558,145 | B2 * | 5/2003 | Wieder | 425/107 |
| 6,702,566 | B1 * | 3/2004 | Bellasalma et al. | 425/451.9 |
| 6,953,331 | B2 * | 10/2005 | Bokich | 425/192 R |
| 7,223,091 | B2 * | 5/2007 | Olsen et al. | 425/450.1 |
| 7,614,873 | B1 * | 11/2009 | Morey | 425/595 |
| 7,828,542 | B2 * | 11/2010 | Bokich | 425/190 |
| 7,862,326 | B2 * | 1/2011 | Wieder | 425/472 |
| 7,895,746 | B2 * | 3/2011 | Bech et al. | 29/889.7 |
| 7,963,759 | B1 * | 6/2011 | Morey | 425/451.9 |
| 8,348,660 | B2 * | 1/2013 | Jumel | 425/521 |
| 8,353,696 | B2 * | 1/2013 | Barber et al. | 425/405.2 |
| 8,469,694 | B2 * | 6/2013 | Mironov | 425/451.9 |
| 2005/0035495 | A1 * | 2/2005 | Baker et al. | 264/318 |
| 2007/0108655 | A1 * | 5/2007 | Aramburu et al. | 264/255 |
| 2007/0257397 | A1 * | 11/2007 | Schilles | 264/259 |
| 2008/0031995 | A1 * | 2/2008 | Galomb | 425/544 |
| 2009/0022841 | A1 * | 1/2009 | Mizuno | 425/450.1 |
| 2009/0071217 | A1 * | 3/2009 | Matsen et al. | 72/342.3 |
| 2009/0074905 | A1 * | 3/2009 | Matsen et al. | 425/547 |
| 2011/0073237 | A1 * | 3/2011 | Rajasingam | 156/60 |
| 2012/0021086 | A1 * | 1/2012 | Ossanai et al. | 425/451.9 |
| 2012/0093964 | A1 * | 4/2012 | Mironov | 425/450.1 |
| 2012/0097333 | A1 * | 4/2012 | Mironov | 156/349 |
| 2012/0205051 | A1 * | 8/2012 | Mironov | 156/389 |
| 2012/0219653 | A1 * | 8/2012 | Mironov | 425/171 |
| 2013/0101694 | A1 * | 4/2013 | Theinert et al. | 425/383 |

FOREIGN PATENT DOCUMENTS

| | | | |
|---|---|---|---|
| CN | 201366772 Y | 12/2009 | |
| JP | 56032091 A * | 4/1981 | F04C 29/00 |
| JP | 61197208 A * | 9/1986 | B29C 33/22 |
| JP | 02136207 A * | 5/1990 | B28B 21/76 |

OTHER PUBLICATIONS

JP Publication No. 61-197208 published Jan. 9, 1986 with English Abstract.

* cited by examiner

ADJUSTABLE ALIGNING DEVICE FOR LARGE COMPOSITE MOULDS

TECHNICAL FIELD OF THE INVENTION

The present invention relates to an adjustable aligning device for moulds especially for large composite moulds

BACKGROUND OF THE INVENTION

It has always been a challenge for manufacturers of large composite parts, particularly wind turbine blades, to obtain accurate alignment between their separate upper and lower moulds, and to adjust the required values of geometry parameters 'overbite' and 'gap'.

Generally two types of alignment device have been applied to correct or adjust overbite and gap:
1. The alignment pin or dowel, consisting of a round or conical bar fixed to one mould, oriented more or less normal to the mould mating face, entering in a hole on the opposite mould. The alignment pin does not provide a means for adjusting gap, only overbite.
2. The alignment key or block, featuring a trapezoidal piece fixed to one mould, oriented more of less normal to the mould mating face, entering a V block or groove on the opposite mould.

The alignment pin or dowel has been traditionally totally fixed to one mould, placed as accurately as possible, and not adjustable in any way.

The alignment key or block has been traditionally adjustable by means of slotted holes and bolts. In some cases, the open space distance between the moulds, or gap, has been adjusted by shims. Generally adjustment has been laborious, requiring first opening of the mould, then loosening of the locking bolts, perhaps removal or addition of shims, fine adjustment of the alignment key position by hand or perhaps by tapping with a hammer, tightening the locking bolts, and rechecking the mould alignment and gap. A major disadvantage is that the gap cannot be adjusted without accidentally perturbing the overbite setting. Anyway, performing such adjustments on a large mould normally has required considerable experience and skill, and cannot be accomplished quickly.

SUMMARY OF THE INVENTION

The present invention aims to allow the overbite and gap to be adjusted independently, to eliminate the need for shims or spacers, to allow the fine calibration of overbite, and to reduce the time and skill needed for adjustment.

In accordance with the present invention, there is provided an adjustable aligning device for a large composite mould including a first half part and a second half part, wherein the adjustable aligning device includes a first member and a second member which are coupled to the first half part and the second half part of the mould, and have mating portions and are capable of moving relative to each other.

In one aspect of the present invention, the first member includes a base block connected to the first half part of the mould, a base plate detachably fastened to the bas block, and a male block protruding from the base plate, and wherein the second member includes a groove adapted to receive the male block.

In one aspect of the present invention, a nut member is fixed to a bottom surface of the base plate and received in a predetermined space formed within the base block, and is engaged with a threaded bar pivotably supported in the base block.

In one aspect of the present invention, the base plate of the first member is secured to the base block by means of a locking bolt(s) or screw(s).

In one aspect of the present invention, four grooves running in the transverse direction are formed at four corners of the base plate respectively, and each of the grooves has a width allowing passage of a main body of the locking bolt or screw and however being narrower than the diameter of a head portion of the locking bolt or screw, and four threaded holes are formed at corresponding positions of four corners of the base block, and the locking bolt or screw is inserted through the groove and corresponding threaded hole to thus fasten the base plate and the base block together.

In one aspect of the present invention, the second member is provided with a first hole orientated in the direction of opening or closing of the first half part and the second half part of the mould, and an adjustment bolt or screw is inserted through the first hole and abut against the first member with one end so as to adjust the gap between the first member and the second member, and thus the gap between the first half part and the second half part, by means of rotation thereof.

In one aspect of the present invention, the second member is provided with a second hole communicated with the first hole, and a locking bolt is inserted through the second hole and bear upon the adjustment bolt or screw so as to lock the same in place.

The adjustable aligning device allows the fine calibration of overbite of the mould, and may reduce the time and skill needed for adjustment.

DETAILED DESCRIPTION OF THE PREFERRED EMBODIMENTS

A preferred embodiment of the present invention will be described hereinafter with reference to the drawings.

Figure 1:
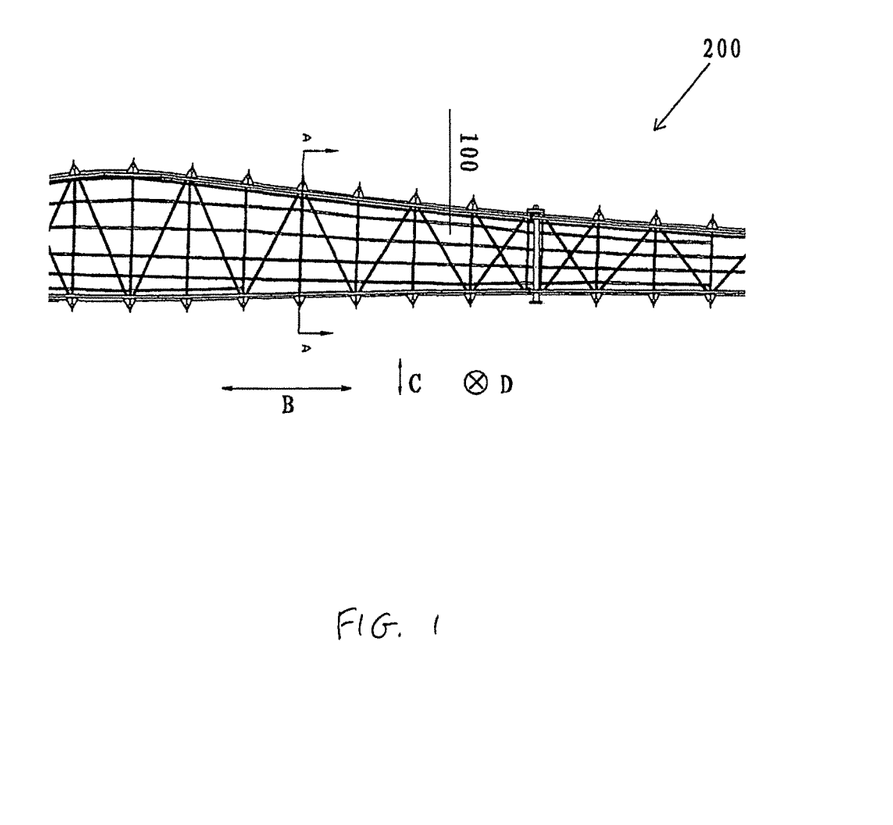
FIG. 1 is a top view schematically illustrating moulds for manufacturing a wind turbine blade and mounting frame thereof.
Figure 2:
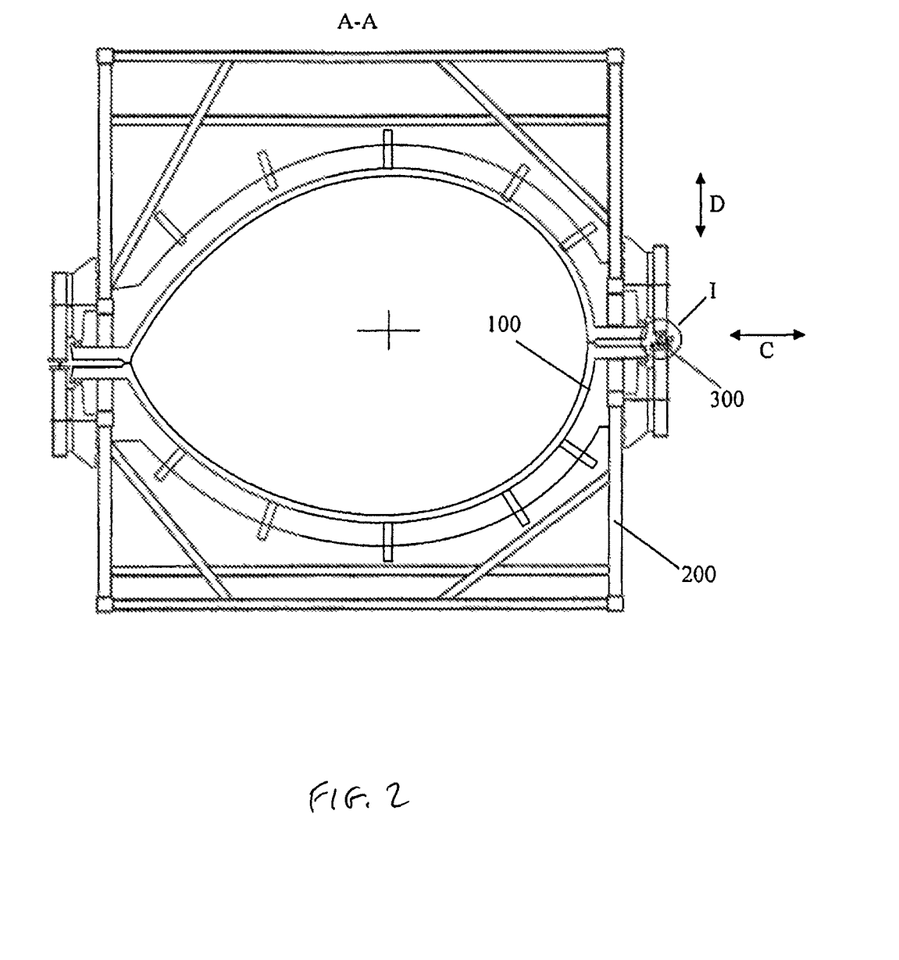
FIG. 2 is a cross-sectional view taken along line A-A in FIG. 1.

As shown in FIGS. 1 and 2, a mould 100 includes a first half part and a second half part (or an upper part and a lower part), and is mounted to a mounting frame 200. An adjustable aligning device 300 according to the present invention is disposed in a periphery coupling region of the first haft part and the second half part of the mould 100.

Please note that, in the present invention, the term "longitudinal direction" refers to a length direction of the blade, as indicated by arrow B; the term "transverse direction (or sense)" refers to a direction perpendicular to the "longitudinal direction", as indicated by arrow C; and the term "normal direction (or sense)" refers to a direction simultaneously perpendicular to the "longitudinal direction" and the "transverse direction", i.e. a direction in which the first half part and the second half part of the mould is opened or closed, as indicated by the arrow D O.

Now referring to FIGS. 3 to 7, the aligning device 300 according to the present invention will be described.

Figure 3:
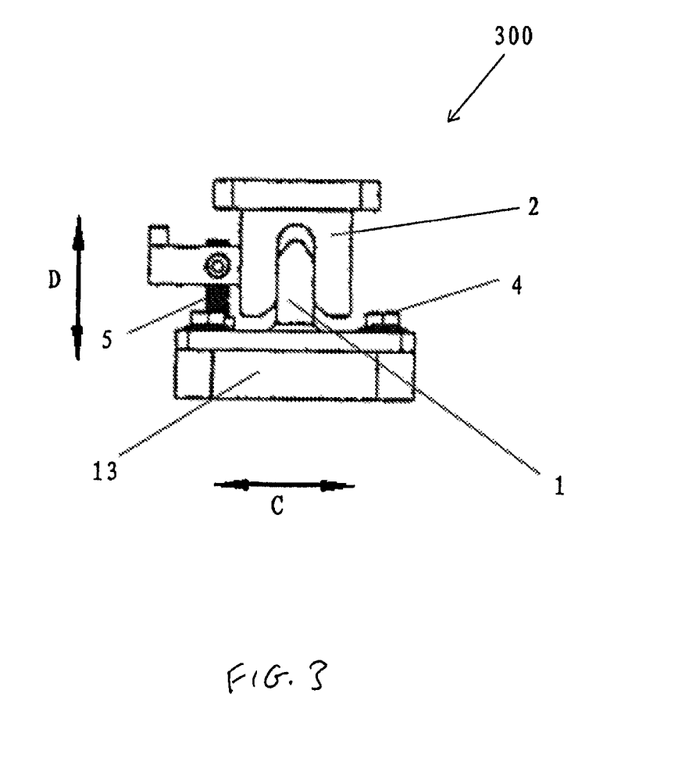
FIG. 3 is a front view, in an enlarged scale, showing the adjustable aligning device in detail I of FIG. 2.
Figure 4:
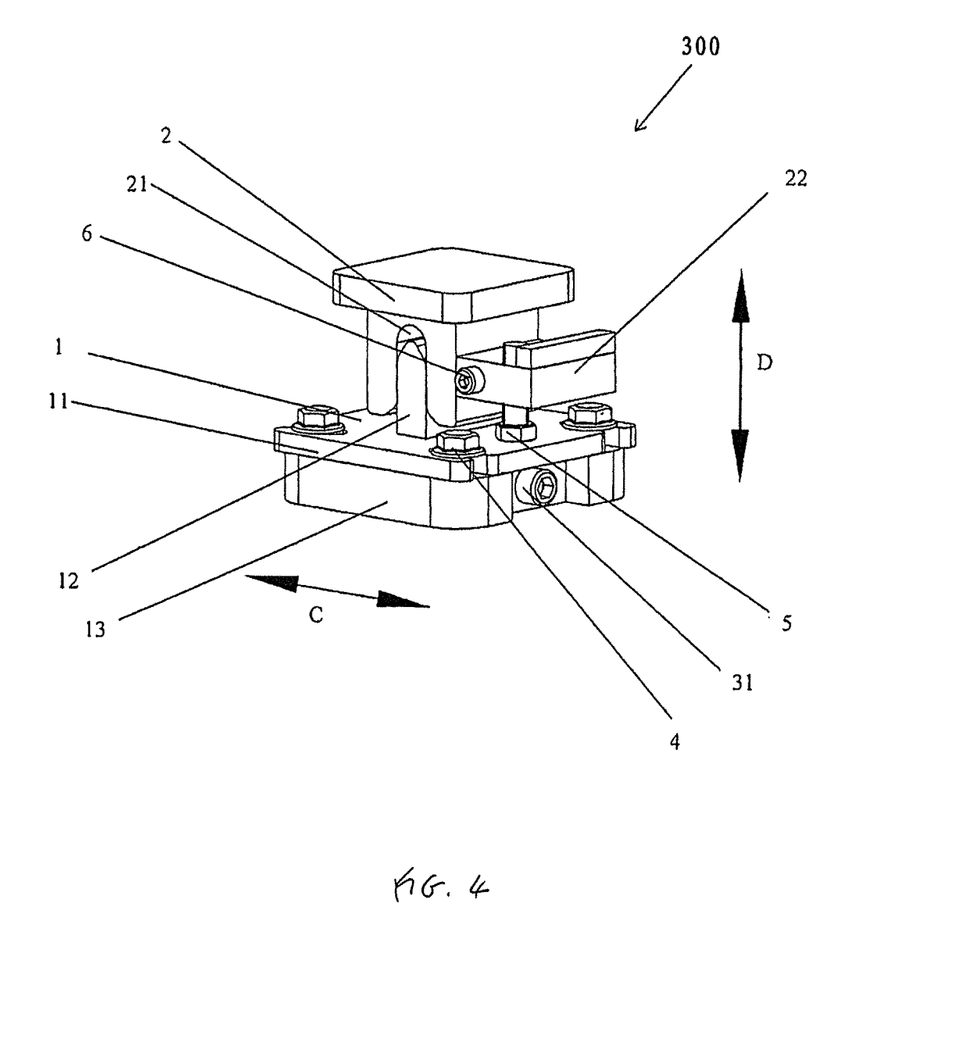
FIG. 4 is a perspective view of the adjustable aligning device as shown in FIG. 3.
Figure 5:
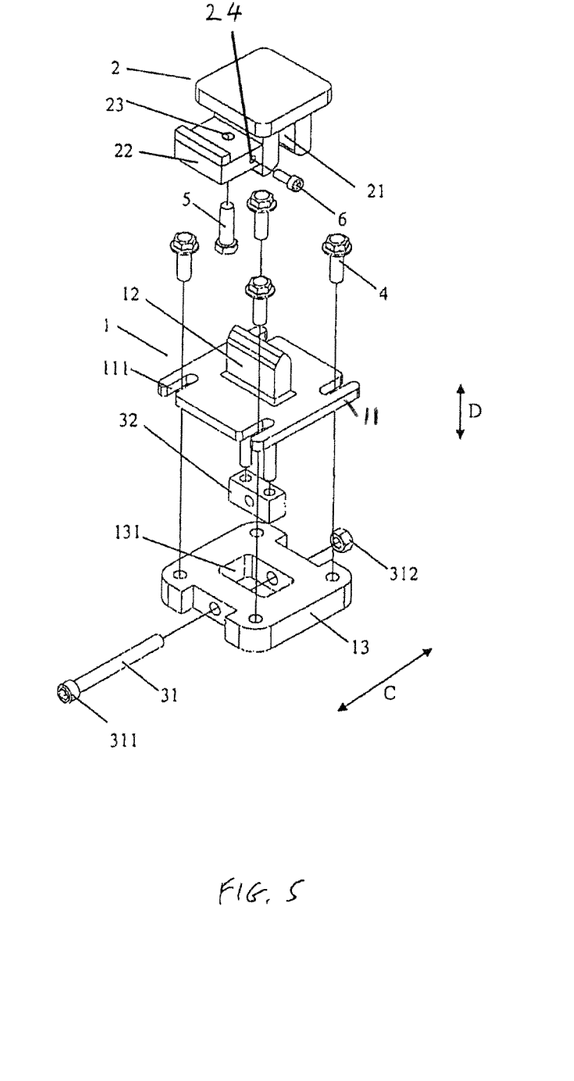
FIG. 5 is an exploded perspective view of the adjustable aligning device.
Figure 6:
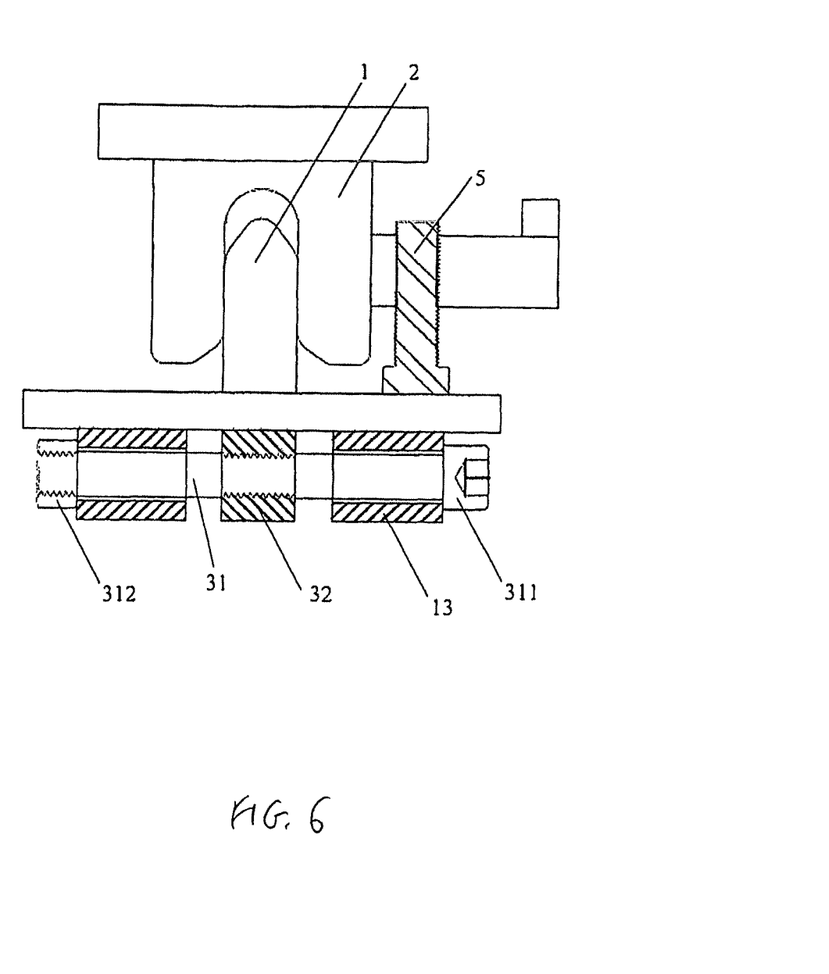
FIG. 6 is a cross-sectional view of the adjustable aligning device.

As best shown in FIG. 5, the aligning device 300 according to the present invention includes a first member 1 and a second member 2 connected to the first half part and the second half part of the mould, respectively. The first member 1 has a male block 12 protruding from a base plate 11. The male block 12 is in the shape of a plate with a predetermined thickness, and its length direction coincides with the above-mentioned longitudinal direction, and its section in the transverse direction includes a rounded end section, trapezoidal section, and rectangular section successively. The second member 2 is provided with a groove 21 adapted to receive the male block 12, as shown in FIGS. 3, 4 and 6. However the groove 21 has greater depth than the height of the male block 12, such that the rectangular portion of the male block 12 can be engaged into the groove 21, providing accurate alignment in the transverse sense, e.g. to set overbite, while the degree of engagement may be freely adjusted in the normal direction, e.g. to set gap. A suitable size for the male alignment block 12 is, for example, with height of 40-80 mm, with length around 40-100 mm, and with width around 30-80 mm. The exact dimensions may vary somewhat with the size and type of mould, but the general form should be kept.

One member of the first member 1 and the second member 2, typically the first member 1, is capable of moving in the transverse sense e.g. to adjust overbite. The other may be fixed.

Figure 7:
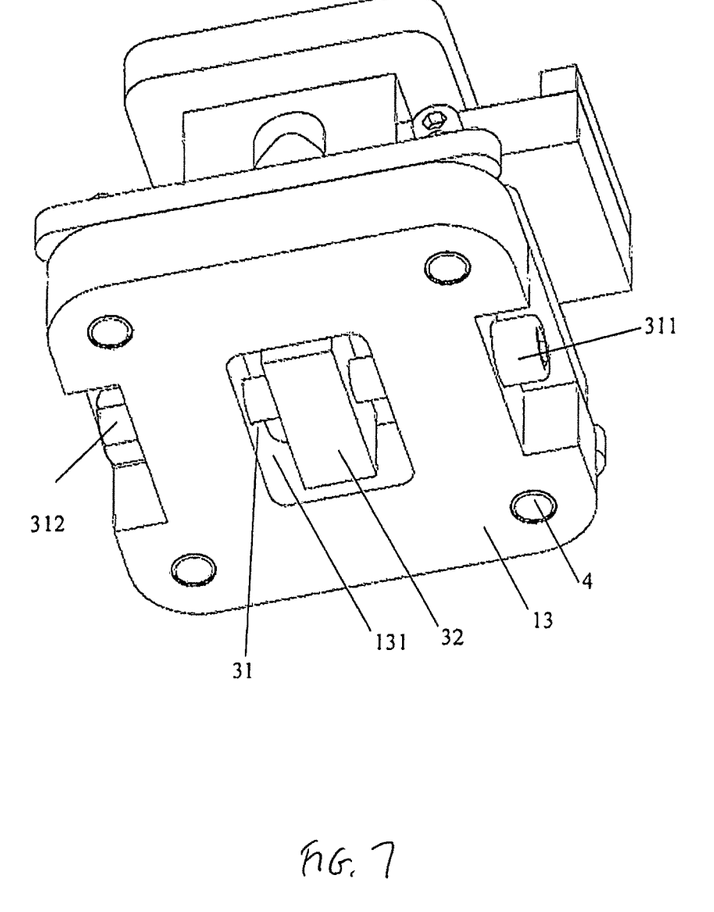
FIG. 7 is a perspective view, viewed from bottom, of the adjustable aligning device.

The moveable alignment member such as the first member 1 may be moved in the transverse sense, e.g. to adjust overbite, by the action of an actuating means which for example comprises a threaded adjustment rod 431 and a nut block 32 engaged with the rod, as shown in FIGS. 5 to 7, in which the nut block 32 is fixed to the lower surface of the base plate 11 of the first member 1 and is provided with internal threads, and the threaded adjustment rod 31 is captured in a base block 13 of the first member 1 (by which the first member 1 is connected to the first half part of the mould) by nuts on both ends, or a head 311 on one end and a nut 312 on the other (see FIG. 7). Therefore the adjustment bar 31 can freely rotate, but it cannot be displaced along the axial or radial direction. Further, the base block 13 is provided with a space 131 for accommodating the nut block 32. Therefore, by rotation of the adjustment bar 31, the nut block 32 and thus the first member 1 will be displaced in the transverse direction, effecting adjustment of the overbite. The displacement can be quite forceful in case that a suitably large adjustment bar is used and enough torque is applied. Suitable sizes for the adjustment bar 31 are, for example, from M6-M20, depending upon the size and type of mould involved.

The moveable member (which is the first member 1 in the present embodiment) of the first member 1 and the second member 2 may be secured against unwanted movement by the frictional action of locking bolts 4, under conditions of normal use. As shown in FIG. 5, there are preferably four locking bolts 4 arranged at four corners of the base plate 11 of the first member 1 respectively. To accomplish the mounting of the four locking bolts 4 as well as allow the moving of the first member 1 relative to the base block 13 in the transverse direction, four grooves 111 running in the transverse direction are formed at four corners of the base plate 11 of the first member 1. Each of the grooves has a width allowing passage of a main body of the locking bolt 4 and however being narrower than the diameter of a head portion of the locking bolt 4 to thus prevent passage of the head. Additionally, four threaded holes are formed at corresponding positions of four corners of the base block 13. The locking bolts 4 are inserted through the grooves 111 and corresponding threaded holes and fasten the first member 1 and the base block 13 together. When the first member 1 is to be displaced in the transverse direction, the locking bolts 4 are firstly released, then the first member 1 is moved to the predetermined position by rotation of the threaded rod 31, and finally the locking bolts 4 are fastened again. It is also possible to use only two locking bolts, but experience has shown the locking effect is unreliable. The locking bolts 4 may for example take the size from M8-M20, depending on the size and type of mould involved.

The non-moveable member (e.g., the second member 2) of the first member 1 and the second member 2 has a adjustment bolt or screw 5 mounted on it's side, normal to the direction of mould closing. Particularly, as shown, the non-movable member (i.e., the second member 2) has a portion 22 which protrudes from the above-mentioned side and is formed with a hole 23 oriented in the normal direction and adapted to engage with the adjustment bolt or screw 5. The adjustment bolt or screw 5 passes through the hole 23 and abuts against the first member 1 (e.g., against the base plate 11) by means of one end thereof. By adjustment of the extension of this bolt or screw 5, it is possible to control the degree of closure, e.g. to adjust the gap. Suitable size for this bolt or screw 5 is for example M6-M24, depending upon the size and type of mould involved.

The adjustment screw 5 for effecting the degree of closure may corporate with a smaller locking screw 6, to prevent inadvertent adjustment during normal use. The smaller locking screw 6 is a small grub screw which may be inserted through a second hole 24 formed in the protruding portion 22 and communicated with the hole 23, and bear upon the threads of the adjustment bolt or screw 5. A suitable size for the locking screw 6 is for example from M4 to M12.

Various other embodiments are conceivable, but a successful implementation of the current invention should include at least:

1. Alignment pins or blocks capable of precision alignment in the transverse (overbite) sense, with simultaneously variable engagement in the normal (gap) direction.

2. The threaded adjustment bar and captured nut to achieve controlled transverse motion and precise adjustment of the overbite.

3. The normally oriented adjustment bolt or screw to precisely control the gap.

4. Locking screws or bolts to prevent accidental adjustment during normal use of the mould.

What is claimed is:

1. An adjustable aligning device for a large composite mould including a first half part and a second half part, wherein the adjustable aligning device includes a first member and a second member which are respectively coupled to the first half part and the second half part of the mould, and have mating portions and are capable of moving relative to each other, wherein the first member includes a base block connected to the first half part of the mould, a base plate detachably fastened to the base block, a nut member fixed to a bottom surface of the base plate and received in a space formed within the base block, the nut member being engaged with a threaded bar captured in the base block and rotatably supported in the base block, rotation of the threaded bar displacing the nut member along the threaded bar and within the space, and displacing in a displacement direction the base plate to which the nut member is fixed, and a male block protruding from the base plate, and wherein the second member includes a groove adapted to receive the male block.

2. The device of claim 1, wherein the base plate of the first member is secured to the base block by means of a locking bolt(s) or screw(s).

3. The device of claim 2, wherein the base plate comprises grooves running in a transverse direction which is aligned with the displacement direction, and each of the grooves has a width allowing passage of a main body of the locking bolt or screw and however being narrower than the diameter of a head portion of the locking bolt or screw, and four threaded holes are formed at corresponding positions of four corners of the base block, and the locking bolt or screw is inserted through the groove and corresponding threaded hole to thus fasten the base plate and the base block together.

4. The device of claim 1, wherein a gap is provided between the first and second members and the second member is provided with a first hole orientated in the direction of the gap, and an adjustment bolt or screw is inserted through the first hole and a free end of the adjustment bolt or screw abuts against the first member when the groove receives the male block, an extension of the adjustment bolt or screw from the first hole being adjustable so as to adjust the gap between the first member and the second member, and thus the gap between the first half part and the second half part.

5. The device of claim 4, wherein the second member is provided with a second hole communicated with the first hole, and a locking bolt is inserted through the second hole and bears upon the adjustment bolt or screw so as to lock the same in place.

* * * * *

UNITED STATES PATENT AND TRADEMARK OFFICE
CERTIFICATE OF CORRECTION

PATENT NO. : 8,647,108 B2  
APPLICATION NO. : 13/255966  
DATED : February 11, 2014  
INVENTOR(S) : Gabriel Mironov Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 51 days.

Signed and Sealed this

Twenty-ninth Day of September, 2015

Michelle K. Lee
*Director of the United States Patent and Trademark Office*